(12) United States Patent
Rakshit et al.

(10) Patent No.: US 10,957,025 B2
(45) Date of Patent: Mar. 23, 2021

(54) PHOTOGRAPH WITH VARIABLE LIGHT SOURCE DISTRIBUTION

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/207,238

(22) Filed: Dec. 3, 2018

(65) Prior Publication Data

US 2020/0175659 A1 Jun. 4, 2020

(51) Int. Cl.
*G06T 5/00* (2006.01)
(52) U.S. Cl.
CPC .......... *G06T 5/009* (2013.01); *G06T 2200/21* (2013.01)
(58) Field of Classification Search
CPC ............................ G06T 5/009; G06T 2200/21
See application file for complete search history.

(56) References Cited

U.S. PATENT DOCUMENTS

| | | | |
|---|---|---|---|
| 5,633,952 A | 5/1997 | Outa | |
| 9,384,553 B2 | 7/2016 | Tuzel | |
| 9,437,035 B2 | 9/2016 | Free | |
| 9,516,214 B2 | 12/2016 | Fujiwara | |
| 9,542,975 B2 | 1/2017 | Osman | |
| 9,639,773 B2 | 5/2017 | Lalonde | |
| 9,710,934 B1 | 7/2017 | Usikov | |
| 2002/0039441 A1 | 4/2002 | Klassen | |
| 2004/0213478 A1* | 10/2004 | Chesnokov | G06T 5/009 382/260 |

(Continued)

FOREIGN PATENT DOCUMENTS

| | | |
|---|---|---|
| JP | 2017138730 A | 8/2017 |
| WO | 2003025860 A1 | 3/2003 |

OTHER PUBLICATIONS

Google Scholar Search Results.*

(Continued)

*Primary Examiner* — Qun Shen
(74) *Attorney, Agent, or Firm* — Patrick J. Daugherty; Daugherty & Del Zoppo Co. LPA (57) ABSTRACT

Aspects vary object illumination values within a digital photograph in response to relocating light-emitting objects. Embodiments generate a three-dimensional model of a digital photograph defined by pixel data that plots a representation of a light source at a first location in a three-dimensional physical space relative to plotted locations of remaining other digital photograph pixels; relocate the representation of the light source within the three-dimensional model to a different, second location within the model three-dimensional physical space; revise a brightness value of a first pixel in proportion to an amount of a change in distance from the first pixel to the second location, relative to a distance to the first, plotted light source location; and generate a revised version of the photograph from the pixel data inclusive of the revised brightness value of the first pixel.

14 Claims, 6 Drawing Sheets

(56) References Cited

U.S. PATENT DOCUMENTS

| | | | | |
|---|---|---|---|---|
| 2009/0025747 | A1* | 1/2009 | Edgar | B05B 5/1691 132/320 |
| 2011/0150101 | A1* | 6/2011 | Liu | H04N 13/246 375/240.26 |
| 2011/0292406 | A1* | 12/2011 | Hollenbeck | G01B 11/2518 356/607 |
| 2015/0146972 | A1 | 5/2015 | Lalonde | |
| 2016/0012182 | A1* | 1/2016 | Golay | G16H 40/20 705/3 |
| 2016/0055268 | A1* | 2/2016 | Bell | G06K 9/00201 703/1 |
| 2016/0364602 | A1 | 12/2016 | Kim | |
| 2017/0019607 | A1 | 1/2017 | Bostick | |
| 2017/0019610 | A1 | 1/2017 | Bostick | |
| 2017/0032499 | A1 | 2/2017 | Bostick | |
| 2018/0210185 | A1* | 7/2018 | Kato | G06K 9/00147 |
| 2018/0350101 | A1* | 12/2018 | Glover | G06T 7/73 |
| 2020/0041261 | A1* | 2/2020 | Bernstein | A61B 1/07 |
| 2020/0105005 | A1* | 4/2020 | Grossinger | G06T 7/579 |

OTHER PUBLICATIONS

Autodesk, Controlling the Brightness of a Light Source, Apr. 18, 2014, entire document.

Autodesk, Measuring Light Levels, Autodesk Knowledge Network, 2018, entire document, https://sustainabilityworkshop.autodesk.com/buildings/measuring-light-levelsk entire document.

CCTV Information, Infra Red Illumination, 2009, entire document, http://www.cctv-information.co.uk/w/index.php?title=Infra_Redillumination&oldid=751, entire document.

Jacqui Ross, Colour Analysis Tools in ImageJ, Jul. 11, 2007, Biomedical Imaging Research Unit School of Medical Sciences, Faculty of Medical and Health Sciences, The University of Auckland, entire document.

Laskowski, Detection of light sources in digital photographs, 2007, entire document, Institute of Computer Graphics Technical University of Szczecin, Szczecin, Poland, https://www.cescg.org/CESCG-2007/papers/Szczecin-Laskowski-Maciej.pdf, entire document.

Live Home 3D, The Light Source Editor, accessed 2018, entire document, https://www.livehome3d.com/support/lh3d-hielp/light_source_editor.html, entire document.

NBD-TECH, Calculating the Perceived Brightness of a Color, 2008, entire document, http://www.nbdtech.com/Blog/archive/2008/04/27/Calculating-the-Perceived-Brightness-of-a-Color, entire document.

Peter Mell et al, The NIST Definition of Cloud Computing, National Institute of Standards and Technology, Publication 800-145, 2011, entire document.

Martin Krzywinski, Image Color Summarizer, 2018, entire document, http://mkweb.bcgsc.ca/color-summarizer, entire document.

* cited by examiner

PHOTOGRAPH WITH VARIABLE LIGHT SOURCE DISTRIBUTION

BACKGROUND

Digital photography processes and systems enable photo image data to be revised and manipulated to generate different photographs (sometimes herein "photos") from image data, for example, by utilizing filters or controlling tint, brightness, color, and other image attributes.

BRIEF SUMMARY

In one aspect of the present invention, a computer implemented method includes generating a three-dimensional model of a digital photograph that is defined by pixel data (a group of pixels) that plots a representation of a light source at a first location in a three-dimensional physical space relative to plotted locations of remaining others of the digital photograph pixels; relocating the representation of the light source within the three-dimensional model from the first location to a different, second location within the three-dimensional physical space of the model; revising a brightness value of a first pixel of the digital photograph pixels in proportion to an amount of a change in distance from the first pixel to the second location of the light source, relative to a distance of the first pixel to the first, plotted location of the light source; and generating a revised version of the photograph from the pixel data that is inclusive of the revised brightness value of the first pixel.

In another aspect, a computer system has a hardware processor in circuit communication with a computer readable memory and a computer-readable storage medium having program instructions stored thereon. The processor executes the program instructions stored on the computer-readable storage medium via the computer readable memory and thereby generates a three-dimensional model of a digital photograph that is defined by pixel data that plots a representation of a light source at a first location in a three-dimensional physical space relative to plotted locations of remaining others of the digital photograph pixels; relocates the representation of the light source within the three-dimensional model from the first location to a different, second location within the three-dimensional physical space of the model; revises a brightness value of a first pixel of the digital photograph pixels in proportion to an amount of a change in distance from the first pixel to the second location of the light source, relative to a distance of the first pixel to the first, plotted location of the light source; and generates a revised version of the photograph from the pixel data that is inclusive of the revised brightness value of the first pixel.

In another aspect, a computer program product has a computer-readable storage medium with computer readable program code embodied therewith. The computer readable program code includes instructions for execution which cause a processor to generate a three-dimensional model of a digital photograph that is defined by pixel data that plots a representation of a light source at a first location in a three-dimensional physical space relative to plotted locations of remaining others of the digital photograph pixels; relocate the representation of the light source within the three-dimensional model from the first location to a different, second location within the three-dimensional physical space of the model; revise a brightness value of a first pixel of the digital photograph pixels in proportion to an amount of a change in distance from the first pixel to the second location of the light source, relative to a distance of the first pixel to the first, plotted location of the light source; and generate a revised version of the photograph from the pixel data that is inclusive of the revised brightness value of the first pixel.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
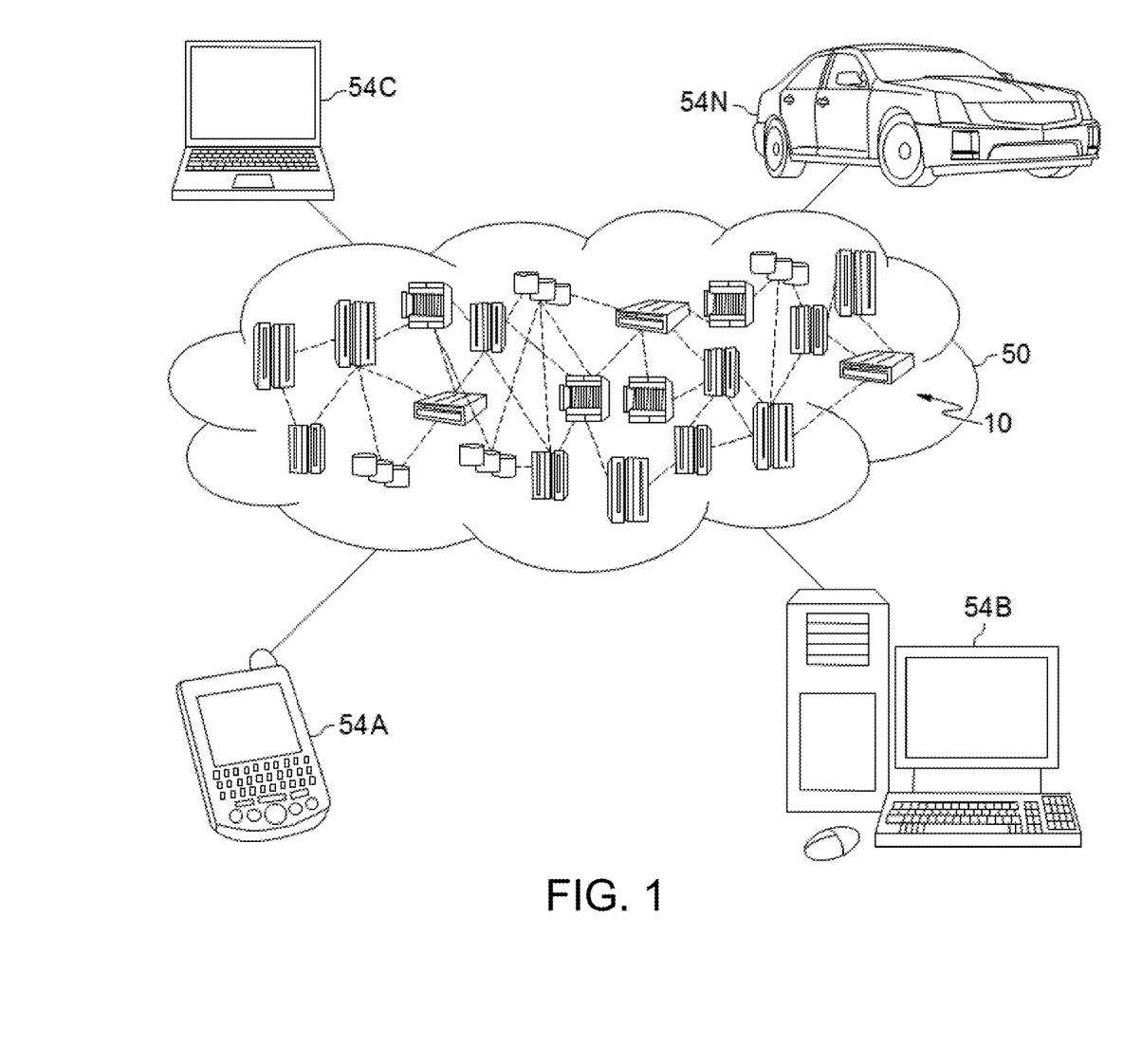
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
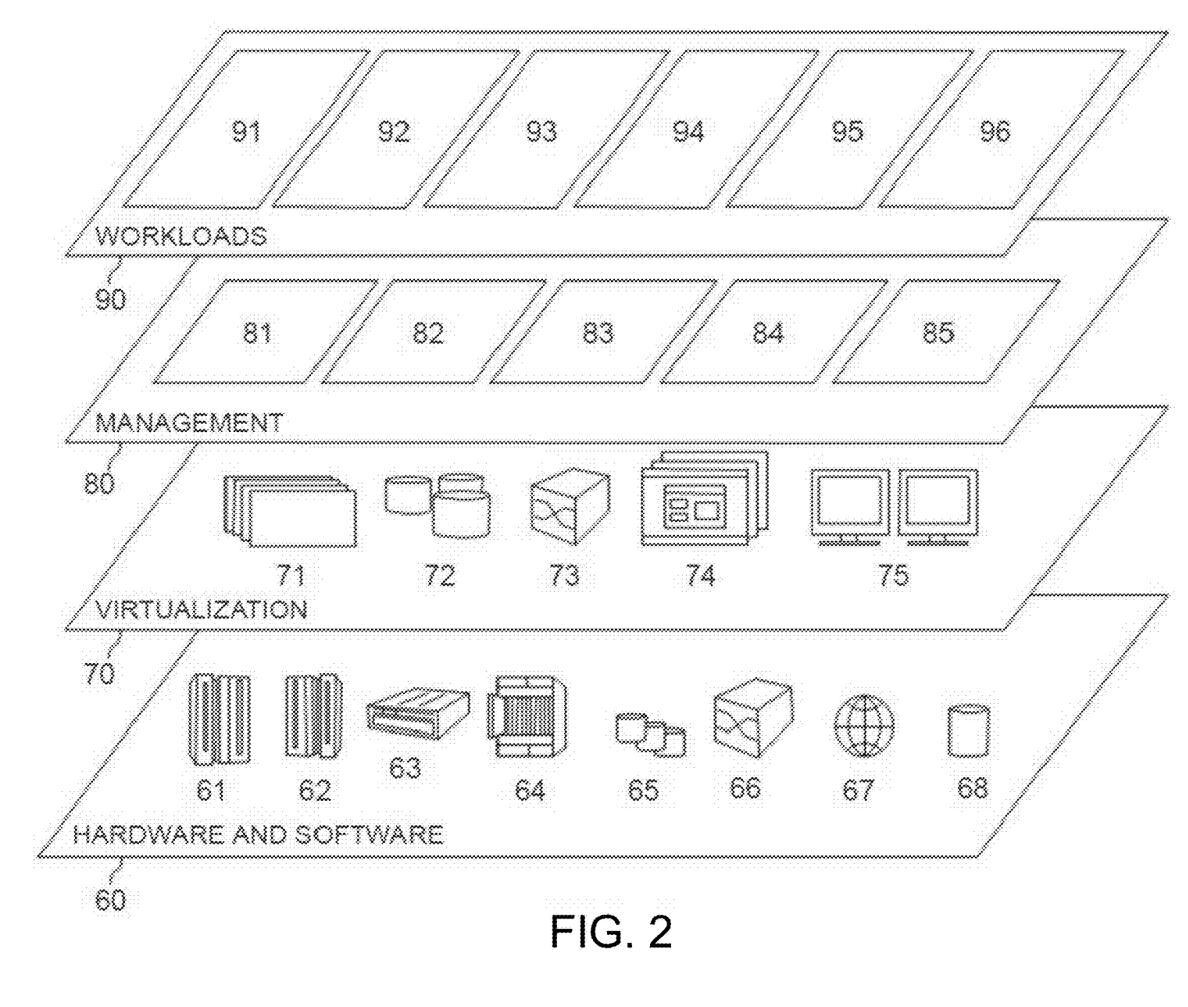
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for varying object illumination values within a digital photograph in response to relocating light-emitting objects according to aspects of the present invention 96.

Figure 3:
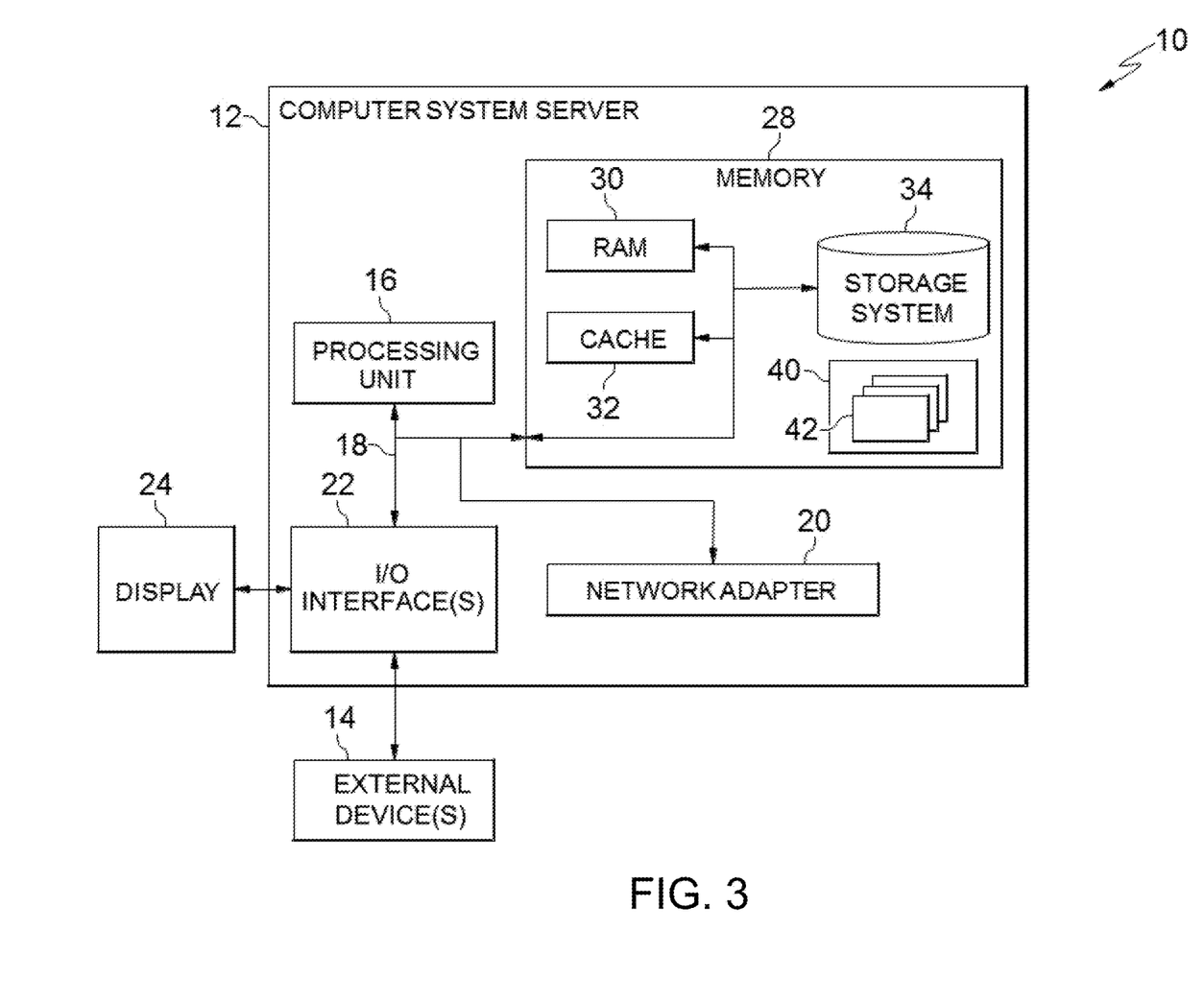
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
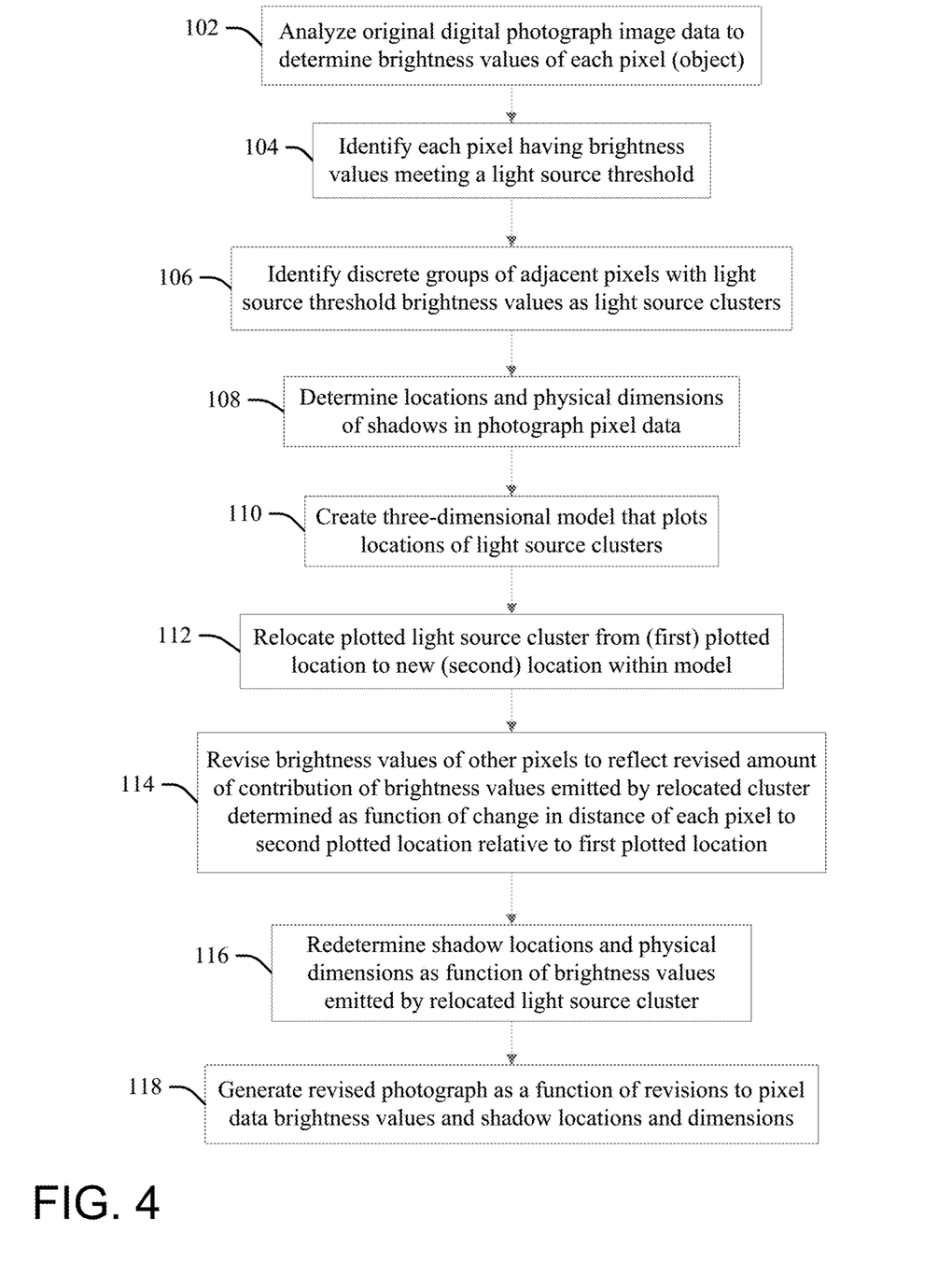
FIG. 4 is a block diagram illustration of an embodiment of the present invention.

FIG. 4 illustrates a system, process, or device according to an embodiment of the present invention. At 102 a processor that is configured according to the present invention (the "configured processor") analyzes image data of an original digital photograph to determine a brightness level or amount (value) for each individual pixel (or pixel object) of the photograph (or an object-based representation of digital photograph data).

At 104 the configured processor identifies each of the pixels that have determined brightness values that meet a light source threshold.

At 106 the configured processor identifies groups of adjacent (first) pixels that have determined brightness values that meet the light source threshold as light source clusters, and wherein some embodiments determine total brightness intensity values for each cluster as a function of the brightness values of their cluster pixels. The light source clusters are determined to represent light-emitting objects that are visible within the photograph image data and that directly emit or reflect high values of brightness, wherein it may act as a source of light that illuminate other surfaces within other pixel data of the digital photograph (for example, a lamp, streetlight, flashlight, flashbulb or automobile headlight, a fire, the sun, the moon, etc.). The light source clusters have a shape defined (bordered) by the two-dimensional locations of the adjacent first pixels in the cluster group. In some aspects an outer border of each cluster is further defined in contrast to other (second) pixels that are next to the cluster of first pixels and have determined brightness values that do not meet (are below) the light source threshold.

Embodiments define photometry-based brightness level or intensity values for each of the pixel data items. As used herein "pixels" refers to individual pixels used to define the digital photograph, or groups of neighboring pixels that are formed into pixel objects at a larger desired level of granularity. Photometry-based intensity values provide objective measurements of light in terms of perceived brightness to the human eye (as distinct from radiometry-based light metrics that measure light and other radiant energy in terms of absolute power, independent of perceived brightness). For example, one embodiment determines brightness values by weighting radiant power by a luminosity function that models human brightness sensitivity. For example, the configured processor may define the intensity values in "lux" ("lx"), a derived unit of illuminance and luminous emittance measuring luminous flux per unit area, and generally equal to one lumen per square meter. Lux is commonly used as a measure of the intensity as perceived by the human eye of light that hits or passes through a surface; it is analogous to the radiometric domain unit of "watt per square meter," but with the power at each red ("R"), green ("G") and blue ("B") wavelength component weighted according to the luminosity function, a standardized model of human visual brightness perception. Thus, aspects may define brightness values by comparing and contrasting distributions of R, G and B color wavelengths or Hue Saturation Brightness (HSB) values.

Some embodiments group pixels together into clusters at 108 that are both within a threshold of brightness and within a threshold of likeness of R, G, B color or HSB values relative to other, surrounding pixels, according to the following process:

(i) identify R, G and B values within each pixel;
(ii) group adjacent pixels having the same value of R, G and B color distribution into discrete clusters;
(iii) determine the total brightness intensity value ("I") for each cluster for the total R, G and B values of each pixel within the cluster grouping according to the expression "(I=sqrt((0.241*R*R)+(0.691*G*G)+(0.068*B*B))"; and
(iv) consider only those clusters that have a value "I" that meets a minimum threshold value of brightness as a "source of light" cluster.

At 108 the configured processor determines (identifies) the locations and physical dimensions of shadow areas created by the objects present in the original photograph data that occlude light distributed from light sources including the light source clusters.

At 110 the configured processor creates a three-dimensional (3D) model of the photograph pixel data that plots locations of modelled representations of the light source clusters (and thus, the light-emitting objects depicted thereby in the digital photograph by the clustered pixel values) in a three-dimensional physical space relative to the plotted locations of others of the digital photograph pixels. Aspects may generate model values as a function of image depth analysis and object recognition processes applied to the photograph pixel data and associated information and attributes. More particularly, the 3D model created at 110 defines 3D location position data relative to a photograph reference point for the light-emitting objects representing light source clusters and their associated light source intensity values relative to each other, and for other objects and surfaces that are depicted within the photograph.

At 112, in response to an input (including from a user or other editor), the configured processor relocates a modelled representation of a (first) one of the light source pixel clusters that has a (first) defined brightness intensity value from a current (first) position plotted within the 3D model to a different (second) position.

At 114 the configured processor revises brightness values of other pixels within the photograph data (those not with the first cluster) to reflect revised amount of contribution of brightness values emitted by relocated first cluster that are determined as function of change in distance of each pixel to second plotted location relative to first plotted location. More particularly, brightness intensity values distributed and perceived by a viewer within pixel data as reflected on surfaces generally diminish progressively as distance increases from the light source, and/or from a reference viewpoint of the photograph (for example, the lens location used to capture the image), for example, as a function of the expression "E=I/(D*D)", where "E" is the perceived illumination level at distance "D" from a determined cluster light source brightness intensity value "I" of the cluster light source (defined in terms of R, G and B wavelength values, and not as a general illumination level or radiometric domain "power" of the light object source represented by the pixel cluster).

Embodiments estimate and recalculate new brightness values at 114 for other pixels that reflect changes in contribution to their respective brightness intensity values from light emitted by the object represented by the relocated light source pixel cluster, said differences determined as a function of distance to the new cluster location: increasing the value contributed from the first cluster in proportion to a decrease in amount of distance relative to the original, first position; and decreasing the value contributed from the first cluster in proportion to a decrease in amount of distance relative to the original, first position. Thus, embodiments identify or estimate the relative contribution of each of the light source clusters to the total light values illuminating areas visible and depicted within the other pixels of the photograph.

At 116 the configured processor recalculates (redetermines) the shadow positions and dimensions in the photograph as a function of pixel distances to the brightness values of the relocated light source cluster, and further as a function of projected interactions (occlusions) of light projected by the relocated light source with mapped objects.

At 118 the configured processor generates a revised photograph as a function of revisions to pixel data brightness values and shadow locations and dimensions. Thus, embodiments generate a revised photograph at 118 as a function of the impact of revisions to the pixel data as modelled, wherein some pixels in the revised photograph have different color or brightness values relative to the original photograph, the changes driven by the projected, estimated or modelled effects of the relocated light source on the changed pixels.

Figure 5:
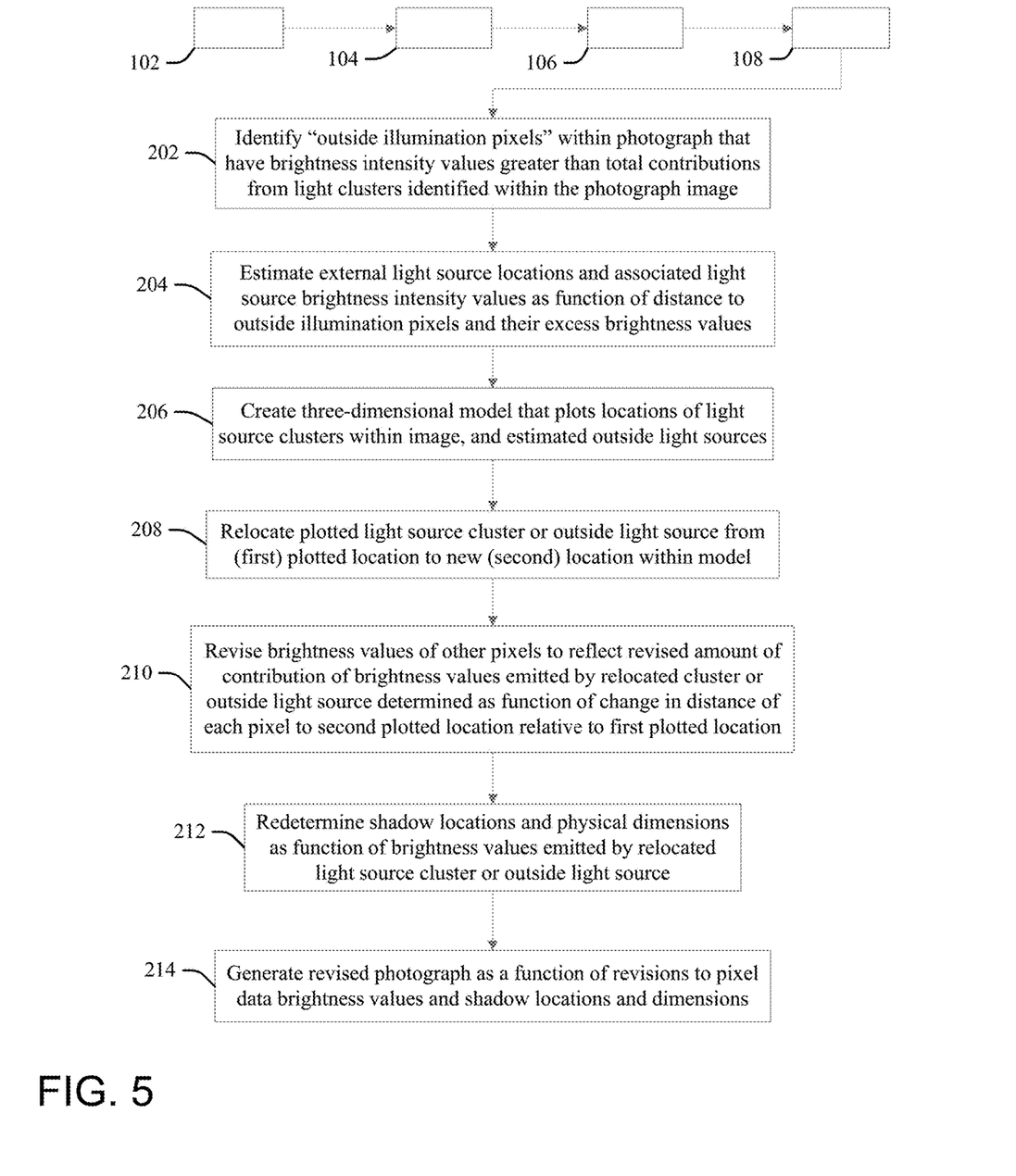
FIG. 5 is a block diagram illustration of another embodiment of the present invention.

FIG. 5 illustrates another embodiment of the present invention that includes processes similar to those described above with respect to FIG. 4 of analyzing image data of an original digital photograph to determine a brightness values for individual pixels at 102, identifying pixels that have determined brightness values that meet a light source threshold at 104, identifying groups of adjacent pixels having determined brightness values meeting the light source threshold as light source clusters at 106, and determining shadow locations and physical dimensions at 108.

At 202, the configured processor identifies as "outside illumination pixels" those pixels within the photograph that have brightness intensity values that are greater than a total of illumination contribution values attributable to the light clusters determined at 106. This identification assumes that additional source of lights must be present outside the frame of and therefore not visible within the photograph image data, that it is physically external to outer boundaries of a geographic area represented by the digital photograph pixels (for example, the sun, the moon, lights located out of the picture, etc.) that contribute the additional brightness intensity values that are determined within the outside illumination pixels, generally as distributed across the light-reflective surfaces visible within the pixels.

At 204 the configured processor estimates (determines, predicts) likely locations and associated light source intensity values for external light sources as a function of their distances to ones of the outside illumination pixels, and their respective excess illumination values, which are the amounts determined at 202 in excess of the total amounts of contribution from the light source clusters identified within the photograph.

Figure 6:
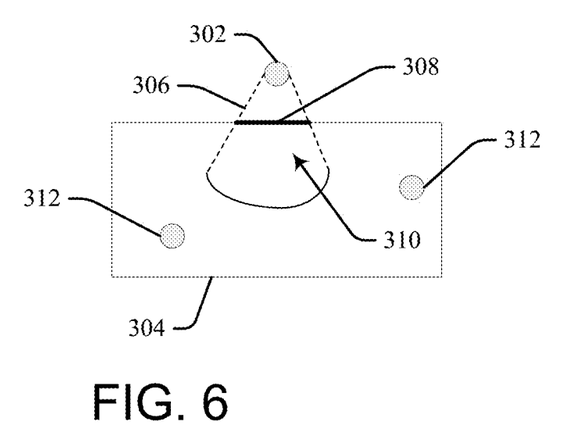
FIG. 6 is a graphic illustration of an implementation of an embodiment according to the present invention.

Referring to FIG. 6, some aspects estimate the location and light intensity of a light source 302 that is located outside the photograph frame 304 as a function of determining a distribution pattern or profile 306 of an illumination contribution from the outside light source 302 that has an initial width dimension 308 defined at the edge of the frame 304 that is defined as a span of those of the outside illumination pixels 310 that are located within the profile 306 and at the edge 304 and that share a common (or similar) amount of excess (surplus) hue or brightness illumination values relative to the contributions of the light cluster sources 312 defined within the image frame 304. The embodiment determines the location 302 of the outside relative to the photograph frame 304 as the point of origin of the pattern of excess hue or brightness illumination values observed in adjacent ones of the outside illumination pixels 310 located within the pattern 306, including as a function of their respective distances from the frame edge 304. Thus, assuming that contributions for the outside source 302 continually diminish and lose influence on increasing brightness factors for each adjacent outside illumination pixel 310 as distances increase from the edge of the picture 304, the patterns of amounts of excess contribution added to each outside illumination pixel is used to extrapolate to the likely location 302 of the outside source relative to the frame 304 and to the locations of the outside illumination pixels 310 located within the pattern 306.

Some aspects estimate the location and light intensity of a light source external to the photo frame as a function of the determined shadow area locations and dimensions. For example, aspects may determine the locations of pixels that comprise object image data having physical dimensions that are expected (projected) to block light intensity distribution from an outside source, and thus make a corresponding determination that pixels on the other side of the object pixels relative to the edge of the frame are within a known shadow that confirms, or increases a probability, that a light source is located outside frame and opposite the shadow pixels relative to the object pixels.

Aspects may also predict or determine locations of outside, external light sources as a function of comparing the photograph pixel illumination intensity data to the pixel data of knowledge base or labeled photographs that are known to have illumination intensity data values generated by light sources outside of the frame. For example, comparison of image data of a photograph of a street scene that includes a visible object "Y" to knowledge base street scene images may find a match in pixel data illumination values to a knowledge base photo that is labeled as including illumination from a street light located outside of the image and 20 meters from an illuminated object "X," wherein the configured processor thereby determines at 206 that an outside light source of a similar intensity is located about 20 meters from object "Y," in response to determining a same amount of illumination from outside sources as determined for object "X." By knowing the distance from the illuminated object to the light source in the knowledge base photo, aspects are enabled to determine the intensity of the source as a function of the illumination values of the object.

Aspects may also determine the likely locations and brightness intensities of the sun and the moon as outside illumination sources at 204 as a function of comparing geographic location data of the digital photograph (such as determined by global positioning satellite (GPS) metadata data) to known relative positions of the sun and the moon at the relevant time and calendar data values, to the known intensities of emitted brightness (for example, as quantified in "foot-candles") of the latitude and longitude of the geographic location data of the digital photograph, and/or to weather condition data (for example, correlating illumination values therefrom to diffusion from clouds, mist or fog occurring at that location at the time and date of acquisition of the digital photo data).

Thus, at 206 the configured processor creates a three-dimensional (3D) model of the photograph pixel data that plots locations of the light source clusters identified within the photograph, the lights sources identified or predicted outside the image frame at 204, and shadow locations and dimension determined at 108. Aspects may generate the 3D model via image depth analysis and object recognition processes applied to the photograph pixel data and associated information and attributes. Thus, the 3D model defined at 208 determines 3D location position data of both inside and outside image light sources relative to some photograph reference point, and optionally for other objects and surfaces and shadow area visible within the photograph.

In response to relocation of a plotted light source cluster or outside light source from a current (first) plotted location to new (second) location within model at 208, at 210 the configured processor revises brightness values of other pixels to reflect revised amount of contribution of brightness values emitted by relocated cluster or outside light source determined as function of change in distance of each pixel to second plotted location relative to first plotted location.

At 212 the configured processor redetermines shadow locations and physical dimensions as function of brightness values emitted by relocated light source cluster or outside light source. At 214 the configured processor generates a revised photograph as a function of revisions at 210 to the pixel data brightness values and shadow locations and dimensions.

Embodiment provide advantages in editing digital photographs over the prior art. By generating three-dimensional models of digital photograph pixel data that plot light sources locations, embodiments enables users to edit digital photograph data in response to changing the modelled positions of the light sources, both within and outside the frame of the picture. Thus, regions of a scene represented by digital photograph pixel data may be selectively brightened, or darkened, by moving the plotted light sources (revising brightness values of region pixels in proportion to an amount of a change in distance to the relocated light source). Embodiments thereby cause changes in the distribution of light, or the direction and dimension of shadows, within the photo. By changing the position of one or more of sources of light plotted in 3D models, users generate new illumination values in the photograph pixels based on revised distances or exposure to the relocated light source(s).

Aspects generally using inverse-distance rules as described above to dynamically recalculate the distribution of light in the photograph, and accordingly edit the illumination values of pixels defining objects within the photograph in response to changing the position of one or more sources of light casting illumination upon the object. The modeling structures enable users to determine the effects of different light source locations within and outside the image frame, to see the effects of removing a light source or moving it on the intensity of illumination of objects within the digital photo, in one aspect to improve the accurate rendition of objects within the photo via varying the intensity of illumination, or changing shadow locations and dimensions.

By determining or predicting the size, position and strength of light sources that are not within the photograph framework, adjustments to the pictures data may be made more accurate relative to prior art editing methods that do not account for out-of-frame light source effects. Further, users may use the 3D models to test out the effect on the digital photograph of the introduction of additional off-screen light sources, to model the effects on the real-life environment images captured in the original (or previous iteration) of the photo data from the different physical locations and lights intensities relative to the photo frame, and select most preferred options in response to the review of each new photo iteration.

Aspects can selectively change the brightness of a source of light, and in any given photograph there may be multiple sources of light. The contribution of different sources of light within any surrounding context depends on many factors such as the distance between the photographic perspective and the various lights, the distance between light sources, and the specific brightness of each of the various light sources. Each light source has some contribution towards the entire photograph.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:

generating a three-dimensional model of a digital photograph that is defined by a plurality of pixels that plots a representation of a light source at a first location in a three-dimensional physical space relative to plotted locations of remaining others of the digital photograph pixels via identifying a second pixel of the digital photograph pixels that has a brightness intensity value that is greater than a total of illumination contribution values attributable to light sources identified within the digital photograph by a surplus value, and estimating the first location for the light source as physically external to outer boundaries of a geographic area represented by the digital photograph pixels as a function of comparing the surplus value to a distance of a location of the second pixel plotted within the three-dimensional model to the estimated location of the light source;

relocating the representation of the light source within the three-dimensional model from the first location to a different, second location within the three-dimensional physical space of the model;

revising a brightness value of a first pixel of the digital photograph pixels in proportion to an amount of a change in distance from the first pixel to the second location of the light source, relative to a distance of the first pixel to the first, plotted location of the light source; and generating a revised version of the photograph from the plurality of pixels inclusive of the revised brightness value of the first pixel; and wherein the revising the brightness value of the first pixel comprises:

decreasing the brightness value in proportion to an increase in distance from the first pixel to the second location of the light source, relative to the distance to the first, plotted location; and increasing the brightness value in proportion to a decrease in distance from the first pixel to the second location of the light source, relative to the distance to the first, plotted location.

2. The method of claim 1, further comprising:

determining the brightness intensity values for each of the digital photograph pixels as a value "I" defined by the expression "$I=\mathrm{sqrt}((0.241*R*R)+(0.691*G*G)+(0.068*B*B))$", wherein "R" is a value of red wavelength light intensity, "G" is a value of green wavelength light intensity and "B" is a value of blue wavelength light intensity.

3. The method of claim 1, further comprising:

identifying a group of the digital photograph pixels that have brightness values that meet a light source threshold and are adjacent to each other as a cluster of pixels that defines the light source.

4. The method of claim 3, further comprising:

defining a total brightness intensity value for the light source as a function of brightness intensity values of individual ones of the cluster of pixels; and revising the brightness value of the first pixel by a fraction of the total brightness intensity value determined in proportion to the amount of change in distance from the first pixel to the second location of the light source.

5. The method of claim 1, wherein the second pixel is one of a plurality of outside illumination pixels of the digital photograph pixels that each have respective brightness intensity values that are greater than total of illumination contribution values attributable to light sources identified within the digital photograph by different respective surplus values, the method further comprising:

determining a distribution pattern of variation in illumination contributions to each of the outside illumination pixels as a function of comparison of the respective surplus values; and estimating the location for the light source by extrapolating the determined distribution pattern to a point of origin that is located external to the outer boundaries of the digital photograph geographic area.

6. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the generating the three-dimensional model of the digital photograph, the relocating the representation of the light source within the three-dimensional model from the first location to the second location, the revising the brightness value of the first pixel, and the generating the revised version of the photograph.

7. The method of claim 6, wherein the computer-readable program code is provided as a service in a cloud environment.

8. A computer system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

generates a three-dimensional model of a digital photograph that is defined by a plurality of pixels that plots a representation of a light source at a first location in a three-dimensional physical space relative to plotted locations of remaining others of the digital photograph pixels via identifying a second pixel of the digital photograph pixels that has a brightness intensity value that is greater than a total of illumination contribution values attributable to light sources identified within the digital photograph by a surplus value, and estimating the first location for the light source as physically external to outer boundaries of a geographic area represented by the digital photograph pixels as a function of comparing the surplus value to a distance of a location of the second pixel plotted within the three-dimensional model to the estimated location of the light source;

relocates the representation of the light source within the three-dimensional model from the first location to a different, second location within the three-dimensional physical space of the model;

revises a brightness value of a first pixel of the digital photograph pixels in proportion to an amount of a change in distance from the first pixel to the second location of the light source, relative to a distance of the first pixel to the first, plotted location of the light source; and generate a revised version of the photograph from the plurality of pixels inclusive of the revised brightness value of the first pixel; and wherein the computer readable memory revises the brightness value of the first pixel by:

decreasing the brightness value in proportion to an increase in distance from the first pixel to the second location of the light source, relative to the distance to the first, plotted location; and increasing the brightness value in proportion to a decrease in distance from the first pixel to the second location of the light source, relative to the distance to the first, plotted location.

9. The system of claim 8, wherein the processor executes the program instructions stored on the computer-readable storage medium via the computer readable memory and thereby:

identifies a group of the digital photograph pixels that have brightness values that meet a light source threshold and are adjacent to each other as a cluster of pixels that defines the light source.

10. The system of claim 9, wherein the processor executes the program instructions stored on the computer-readable storage medium via the computer readable memory and thereby:

defines a total brightness intensity value for the light source as a function of brightness intensity values of individual ones of the cluster of pixels; and revises the brightness value of the first pixel by a fraction of the total brightness intensity value determined in proportion to the amount of change in distance from the first pixel to the second location of the light source.

11. The system of claim 8, wherein the second pixel is one of a plurality of outside illumination pixels of the digital photograph pixels that each have respective brightness intensity values that are greater than total of illumination contribution values attributable to light sources identified within the digital photograph by different respective surplus values; and wherein the processor executes the program instructions stored on the computer-readable storage medium via the computer readable memory and thereby:

determines a distribution pattern of variation in illumination contributions to each of the outside illumination pixels as a function of comparison of the respective surplus values; and estimates the location for the light source by extrapolating the determined distribution pattern to a point of origin that is located external to the outer boundaries of the digital photograph geographic area.

12. A computer program product, comprising:

a computer readable storage medium having computer readable program code embodied therewith, the computer readable program code comprising instructions for execution by a processor that cause the processor to:

generate a three-dimensional model of a digital photograph that is defined by a plurality of pixels that plots a representation of a light source at a first location in a three-dimensional physical space relative to plotted locations of remaining others of the digital photograph pixels via identifying a second pixel of the digital photograph pixels that has a brightness intensity value that is greater than a total of illumination contribution values attributable to light sources identified within the digital photograph by a surplus value, and estimating the first location for the light source as physically external to outer boundaries of a geographic area represented by the digital photograph pixels as a function of comparing the surplus value to a distance of a location of the second pixel plotted within the three-dimensional model to the estimated location of the light source;

relocate the representation of the light source within the three-dimensional model from the first location to a different, second location within the three-dimensional physical space of the model;

revise a brightness value of a first pixel of the digital photograph pixels in proportion to an amount of a change in distance from the first pixel to the second location of the light source, relative to a distance of the first pixel to the first, plotted location of the light source; and generate a revised version of the photograph from the plurality of pixels inclusive of the revised brightness value of the first pixel; and wherein the computer readable program code instructions for execution by the processor further cause the processor to revise the brightness value of the first pixel by:

decreasing the brightness value in proportion to an increase in distance from the first pixel to the second location of the light source, relative to the distance to the first, plotted location; and increasing the brightness value in proportion to a decrease in distance from the first pixel to the second location of the light source, relative to the distance to the first, plotted location.

13. The computer program product of claim 12, wherein the computer readable program code instructions for execution by the processor further cause the processor to:

identify a group of the digital photograph pixels that have brightness values that meet a light source threshold and are adjacent to each other as a cluster of pixels that defines the light source;

define a total brightness intensity value for the light source as a function of brightness intensity values of individual ones of the cluster of pixels; and revise the brightness value of the first pixel by a fraction of the total brightness intensity value determined in proportion to the amount of change in distance from the first pixel to the second location of the light source.

14. The computer program product of claim 12, wherein the second pixel is one of a plurality of outside illumination pixels of the digital photograph pixels that each have respective brightness intensity values that are greater than total of illumination contribution values attributable to light sources identified within the digital photograph by different respective surplus values; and wherein the computer readable program code instructions for execution by the processor further cause the processor to:

determine a distribution pattern of variation in illumination contributions to each of the outside illumination pixels as a function of comparison of the respective surplus values; and estimate the location for the light source by extrapolating the determined distribution pattern to a point of origin that is located external to the outer boundaries of the digital photograph geographic area.

* * * * *